United States Patent [19]

Hori et al.

[11] 4,122,150

[45] Oct. 24, 1978

[54] PROCESS FOR ELIMINATING DILUTED SULFUR OXIDES IN COMBUSTION EXHAUST GASES

[75] Inventors: Shin Hori, Tokyo; Tomiyoshi Inoue, Fujisawa; Shozo Yamamoto, Mitaka; Kazuo Tatara, Kashiwa; Masahiro Kitagawa, Yokohama; Masaru Watanabe, Tokyo; Yukihiko Okada, Musashino; Naoki Negishi, Tokyo, all of Japan

[73] Assignee: Kogyo Kaihatsu Kenkyusho, Tokyo, Japan

[21] Appl. No.: 869,786

[22] Filed: Oct. 27, 1969

Related U.S. Application Data

[63] Continuation-in-part of Ser. No. 550,374, May 16, 1966, abandoned.

[51] Int. Cl.$^2$ ............................................. C01B 17/00
[52] U.S. Cl. ................................... 423/242; 423/244; 423/539; 55/73
[58] Field of Search ........................ 23/2, 2.1, 3, 178; 55/73; 423/242, 522, 534

[56] References Cited

U.S. PATENT DOCUMENTS

| | | | |
|---|---|---|---|
| 3,473,297 | 10/1969 | Tamura et al. | 23/2 X |
| 3,486,852 | 12/1969 | Tamura et al. | 23/2 X |

*Primary Examiner*—G. O. Peters
*Attorney, Agent, or Firm*—Montague & Ross

[57] ABSTRACT

A process for eliminating sulphur oxides from combustion exhaust gases, comprising the steps of dividing the combustion exhaust gases into a first stream and a second stream, and passing the first stream through a first activated carbon bed which was previously washed with water, thereby drying the activated carbon, cooling the first stream, and removing a substantial portion of sulphur oxides from the first stream by adsorption. The treated first stream is mixed with the second stream and together passed through a second activated carbon bed which was previously dried, thereby removing sulphur oxides by dry adsorption. A third activated carbon bed which was previously used in the dry adsorption step is washed with water, removing the previously adsorbed sulphur oxides therefrom. Each of the first, second and third activated carbon beds are cyclically treated by the drying, dry adsorption and washing steps.

10 Claims, 3 Drawing Figures

PROCESS FOR ELIMINATING DILUTED SULFUR OXIDES IN COMBUSTION EXHAUST GASES

CROSS REFERENCE TO RELATED APPLICATION

This application is a continuation-in-part of our copending application Ser. No. 550,374 filed May 16, 1966, now abandoned.

FIELD OF THE INVENTION

The present invention relates to a process using activated carbon to eliminate sulphur oxides from combustion exhaust gases.

BACKGROUND OF THE INVENTION

In recent years, there has been an increased use of fuel, e.g. heavy oil, containing sulphur. This constitutes a serious problem in terms of a public nuisance, due to the presence of harmful sulphur oxides, i.e. $SO_2$ and $SO_3$, in the exhaust gases which arise from the combustion of such sulphur in the fuel, e.g., in electric power stations and other industrial plants. The elimination of such sulphur oxides is very important from the standpoint of preventing this public nuisance, and there have heretofore been proposed a variety of measures therefor. However, none of these proposals are entirely satisfactory.

Such proposed measures are generally classified in two categories: the wet method and the dry method. The former is based on the principle of wasing out any sulphur oxides in a gas, using water or other solvents. The drawbacks of this method are that it must be carried out at a low temperature, and the exhaust gas after washing is at a low temperature. Consequently there is a large amount of condensed water vapor in the waste gas, with the result that the waste gas does not disperse efficiently when discharged from an exhaust duct into the open atmosphere.

On the other hand, the dry method uses various substances as physical and chemical sorbents, including activated carbon in some cases. This method has the advantage that the waste gas is discharged at a comparatively high temperature thus avoiding the difficulties mentioned above. However, it is not possible to treat large quantities of gas in this way due to the considerable expense involved in replenishing or regenerating the sorbent.

OBJECT OF THE INVENTION

It is an object of the present invention to provide a process for effectively eliminating sulphur oxides contained in exhaust gases, economically and in a manner less costly than by using activated carbon in a dry method.

SUMMARY OF THE INVENTION

The present invention provides a process for eliminating sulphur oxides from combustion exhaust gases, comprising the steps of first dividing the combustion exhaust gases into a first stream and a second stream, second passing the first stream through a first activated carbon which has been previously washed with water, thereby drying the activated carbon, cooling the first stream, and removing a substantial portion of the sulphur oxides from the first stream by adsorption in the activated carbon, third mixing the treated first stream with the second stream, fourth passing the mixed streams through a second activated carbon bed which was previously dried by the second step, thereby removing sulphur oxides from the mixture by a dry adsorption and producing a mist-free low sulphur oxide concentration gas, fifth passing the mist-free low sulphur oxide concentration gas to the atmosphere, sixth washing a third activated carbon bed which was previously used in the fourth step with water, and removing the previously adsorbed sulphur oxides therefrom, and seventh cyclically treating each of the first, second and third activated carbon beds by the second, fourth and sixth steps. the process of eliminating sulphur oxides from combustion exhaust gases carries out the first, second, third, fourth, fifth and sixth steps continuously and simultaneously and each of the activated carbons are simultaneously subjected selectively and sequentially to a different one of each of the second, fourth and sixth steps.

In the present invention we provide a process for eliminating sulphur oxides from combustion exhaust gases in accordance with the above-mentioned objectives, further comprising the step of filtering the combustion exhaust gases to remove solid matter therefrom before passing the gas through the activated carbon, beds.

The invention is particularly concerned with a process wherein combustion exhaust gas containing sulphur oxides is passed through a layer of activated carbon to cause adsorption of sulphur oxides, and wherein the activated carbon, after being used in the adsorption operation for a given time, is washed with water so as to remove the adsorbed sulphur oxides as an acid solution, the activated carbon being subsequently dried by a heated gas, so as to be regenerated.

The process consists of three batchwise unit operations, i.e. a combination of adsorption, washing and drying. The problems to be considered in such a process include the following.

The temperature of the gas stream in the adsorption operation should be preferably less than 130° C. This temperature can be attained either by spraying water, or by feeding air at ambient temperature, into the exhaust gas stream since the temperature of combustion exhaust gases are generally higher than the temperature mentioned above. Alternatively the gas stream may be passed through a heat-exchanger, but the latter adds significantly to the size and cost of the necessary equipment.

In cases in which air is to be used as the gas in the drying operation, the air is required to be heated up to 100° C or higher to obtain a satisfactorily short drying time. Even if the outlet gas from the adsorption operation (at a temperature lower than 130° C) is used as the drying gas, such gas has to provide the latent heat required for the evaporation of water from the activated carbon in the drying operation. Consequently, the temperature of the gas, which has passed through the drying process, is generally reduced to 40° to 60° C and, before the gas can be released into the open air, it must to be reheated in order to improve the dispersion of the gas, and to prevent mist formation. However, the cost of providing and operating the equipment for such reheating is too great to be commercially acceptable.

Although the use of heat exchangers may be considered, this too would give rise to an unacceptably great increase of the construction costs.

The present invention is based on the discovery that it is possible to use the combustion exhaust gases, before treatment to eliminate sulphur oxides, as the gas for the drying operation this has proven to be very effective in solving the problems mentioned above.

The process consists of the three batchwise unit operations, i.e., the combination of adsorption, washing and drying: an adsorption operation in which the sulphur oxides are adsorbed by the activated carbon bed for a given time; a washing operation in which the activated carbon bed is then washed with water so that the adsorbed sulphur oxides are removed from the activated carbon; and a drying operation in which the activated carbon after washing is dried by passing a hot gas over the activated carbon. For the continuous treatment of the gas these three unit operations must be performed simultaneously, and more than three separate carbon layers are required. In this process the exhaust gases to be treated containing the sulphur oxides to be removed, at temperatures higher than that which is suitable for the adsorption operation, are initially divided into two streams, one stream being used continuously in the drying operation as the heat source to dry the carbon. More than half of the sulphur oxides in the gases are adsorbed and oxidized to sulphuric acid by the wet, activated carbon during the drying operation, in spite of the high temperature of the gas itself, while at the same time the carbon layer is dried. Moreover a considerable decrease of drying time is achieved due to the generation of additional heat by adsorption, oxidation, and hydration of the sulphur oxides. The temperature of the outlet gas from the drying process is as low as 40°–60° C (very close to the dew point of the inlet gas). This gas contains almost no $SO_3$, and only a low concentration of $SO_2$, with hardly any mist, i.e., condensed water vapor. This outlet gas from the drying operation, having a lower concentration of sulphur oxides, is mixed with the other divided stream of exhaust gases to be treated producing a gas mixture at a temperature suitable for the adsorption operation, the gas mixture then being passed into the adsorption operation so that the sulphur oxides are adsorbed.

Any solid matter, such as soot and ash in the combustion exhaust gases, which might give rise to obstruction in the layer of activated carbon, can be easily removed by providing a coke layer at the upstream side of the activated carbon, and in this way it is possible to use freely the combustion exhaust gases containing sulphur oxides as a drying gas without causing obstruction of the activated carbon layer.

Under appropriate conditions (for example, an overall contact time with the activated carbon from 2 to 10 seconds, with the combustion exhaust gases at a temperature from 130° to 160° C), the amount of the gas required for the drying operation is about 30 – 70% of the total amount of the gas to be treated, although this does depend on the content of sulphur oxides. Accordingly, it is possible to obtain a gas having a temperature lower than 130° C, which thereby is suitable for the adsorption operation, by mixing the outlet gas from the drying operation (having a reduced temperature) with the other stream of the high temperature combustion exhaust gas. Furthermore, there is little increase in the total volume of gas flowing through the adsorption stage despite the fact that it includes the water vapor driven off from the activated carbon in the drying stage.

Regarding the activated carbon layer, this adsorbs a part of the sulphur dioxide in the gas during the drying operation, and subsequently makes contact with a gas containing sulphur dioxide, at a concentration lower than the original, during the adsorption operation when the residual sulphur dioxide is eliminated by adsorption. Also the sulphur dioxide adsorbed on the activated carbon is oxidized, by oxygen which is inevitably present in such exhaust gases, to sulphur trioxide. Any sulphur trioxide present in the exhaust gases is of course also adsorbed. In this way, where the adsorption is divided in two stages and the concentration of sulphur oxides to be adsorbed differs in these stages, the overall extent of adsorption and oxidation is greater than in the case of a relatively high concentration of sulphur oxides in the gas being adsorbed in one stage. In addition, the arrangement has the advantage that it is flexible, in as much as variations in the temperature, flow rate, and sulphur oxide content of the gases undergoing treatment can be accommodated by varying the proportion of the gas which is fed directly to the drying stage.

Even if mist occurs in the gas leaving the drying operation, so long as such gas pases through the activated carbon layer again the adsorption operation after the drying process, the outlet gas from the complete process contains no mist.

In the adsorption operation, as in the drying operation, heat is generated by adsorption, oxidation, and hydration of sulphur oxides. Accordingly, the outlet gas from the adsorption process maintains a sufficiently high temperature so as to require no heating before dispersion into the open air.

The washing operation may be performed by several conventional washing methods, such as, for example, spraying of water which may be used for fixed bed apparatus. The washing operation for the fixed bed type is easily performed by spraying water in the carbon layer. It is possible to wash the carbon layer uniformly by the same techniques as in the case of a packed tower for gas adsorption. For the moving bed type of carbon layer, the liquid extraction device for porous matter can be used. In either case, pseudo counter-current multistage washing (extraction) is effective in which drained water is used repeatedly for washing.

Dilute sulphuric acid obtained in the washing process is clean and may be put to many uses.

Based on the above, the process of eliminating sulphur oxides, is effected as follows:

1. When required, a coke layer is installed on the upstream side of the activated carbon layer, to eliminate the soot, ash, etc., in the combustion exhaust gases.

2. The combuston exhaust gas is divided into two streams, one of which is used at all times in the drying operation to effect the operation by virtue of the heat content of the gas and heat arising from the reaction thereof.

3. The outlet gas from the drying operation, at a relatively low temperature and with a low concentration of sulphur oxides, is mixed with the other stream of the divided exhaust gas, to form a gas mixture having a temperature suited for the adsorption operation.

4. The gas mixture thus formed therefore contains $SO_2$ at a concentration lower than the original concentration and at a temperature suitable for the adsorption operation. This mixture is blown into the adsorption operation, and then after following a dry type adsorption operation over the dry activated carbon, the resultant waste gas is allowed to disperse into the atmosphere.

The especially important features of the invention are as follows:

1. Almost no fuel, water, etc. is required, for adjustment of the temperature of the gases while the heat content of the combustion exhaust gas is efficiently used. Therefore, the operational costs involve only electricity for the blower and washing water, and consequently these costs are very low.

2. Drying of the washed activated carbon is carried out with a part of the combustion exhaust gas itself. The outlet gas from the drying operation is passed again through the activated carbon layer, in the adsorption operation, so that this final drying operation assures that no mist will be formed in the gas released in the air, thereby insuring the prevention of a public nuisance.

3. Since another hot gas is not used for the drying operation, the volume of inlet gas into the adsorption operation will remain almost the same as that of the original combustion exhaust gas to be treated. Therefore, an additional blower and other equipment are not required, nor is there any increase in the capacity of the equipment required. Consequently the cost of the equipment and construction is minimized.

4. The adsorption of $SO_2$ is carried out in two stages, i.e. first in the drying operation and second in the adsorption operation. Furthermore, it is possible freely to adjust the gas volume divided for the drying operation and the drying time under various conditions. Thus, the adaptability of the process with respect to changes of temperature, flow rate, etc., of the combustion exhaust gas to be treated, is great.

The present invention can utilize the activated carbon layer in any suitable form, for example, fixed bed, moving bed, or fluidized bed. In case of moving bed and fluidized bed, there is not much problem in the practical construction required; while in the case of a fixed bed, it requires an arrangement of three or more beds of activated carbon for the three unit operations of adsorption, washing, and drying to be exchanged and repeated in a multiple stage cycle to treat the combustion exhaust gas continuously. For a desulphurization plant unit an arrangement including a plurality of active carbon-packed towers (preferably six) can be used. However, since this arrangement comprises complex gas ducting, the apparatus described hereinafter, is more convenient.

BRIEF DESCRIPTION OF THE DRAWING

The following detailed description, the present invention, which is shown by example only, will be clearly understood in a connection with the accompanying drawing in which.

SPECIFIC DESCRIPTION

Figure 1:
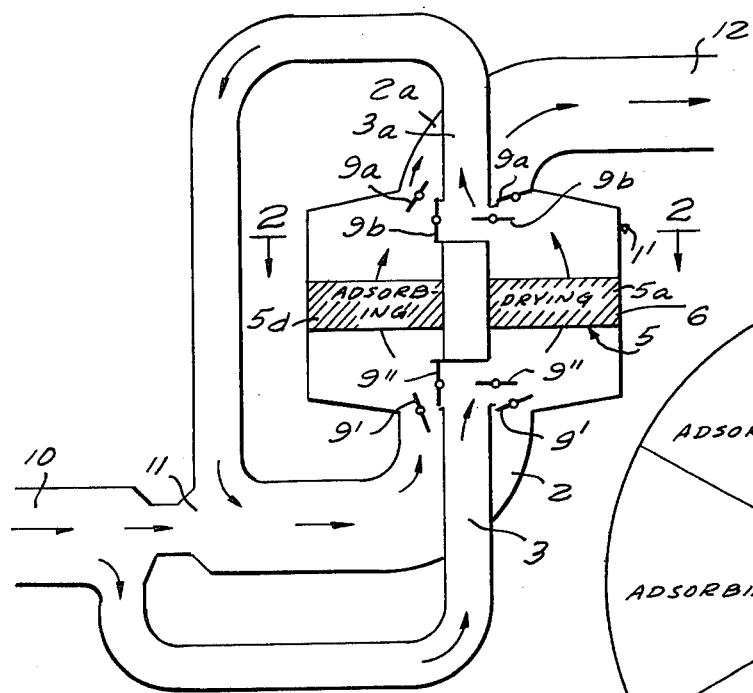
FIG. 1 is a schematic elevation of an apparatus for performing the process according to the invention.

The apparatus comprises an annular chamber 1' defined by internal and external cylindrical walls. Two co-axial passages 2 and 3 extend axially from the lower side of the annular chamber 1' and two similar co-axial passages 2a and 3a extend axially from the upper side thereof. The annular chamber is divided into a plurality of radially extending sectors or compartments 5 by radial portions 4 (six such compartments being illustrated).

Each compartment 5 includes a layer 6 of activated charcoal which forms a fixed bed: each of the chamber portions 7 above this layer can be placed in connection with either passage 2a or passage 3a selectively by means of valves 9a and 9b, respectively, associated with each chamber portion 7. Similarly, each chamber portion 8 below the layer 6 can be placed in connection with either of the passages 2 and 3 selectively by means of valves 9' and 9", respectively, associated with each chamber portion 8.

The passages 2 and 3 constitute inlet passages to the chamber 1', and the passages 2a and 3a constitute outlet passages. A main inlet duct 10 branches so that the incoming combustion exhaust gas to be treated and carried thereby is divided between passages 2 and 3. The valves 9" are set such that the incoming combustion exhaust gases conveyed by passage 3 pass into two of the compartments, viz., compartments 5a and 5b; that is, the valves 9" of the compartments 5a and 5b are open and the valves 9" of the other compartments 5c, 5d, 5e and 5f are closed.

The valves 9b of these two compartments are open and the valves 9a are closed so that such gas after passing through the activated charcoal layer in these two compartments 5a and 5b, performing the drying operation therein, hereinafter described, is conveyed into and through passage 3a to join the inlet passage 2 at junction 11, where such gas mixes with the incoming combustion exhaust gas which flows directly from the main inlet duct 10 into this passage.

Three of the remaining sets of valves (9' and 9") are set such that the gas in passage 2 passes into three of the compartments, viz., compartments 5c, 5d, and 5e, and through the activated charcoal layer therein for the adsorption process hereinafter described in more detail (i.e., valves 9' of each of these compartments are open and valves 9", closed), and from there passes into the outlet passage 2a to be discharged to the atmosphere via exit 12 (i.e. valves 9a of these compartments are open and valves 9b are closed).

Figure 2:
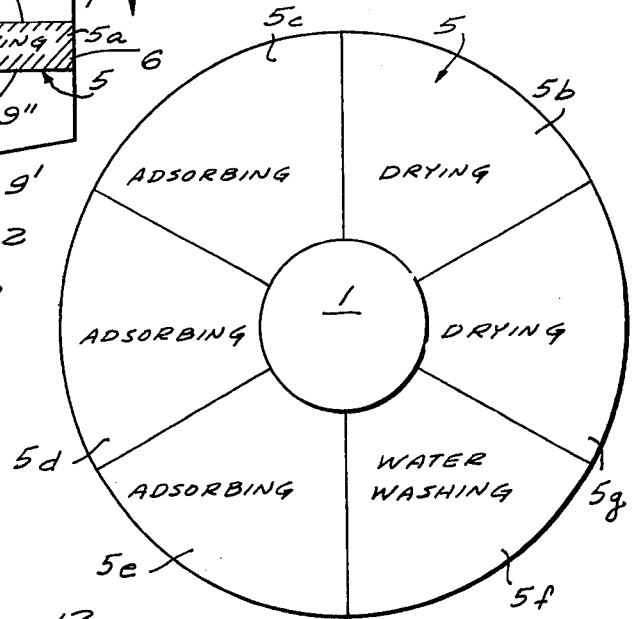
FIG. 2 is a section taken along the lines 2—2 of FIG. 1 illustrating one phase of the operational cycle of an activated carbon layer in such an apparatus.
Figure 3:
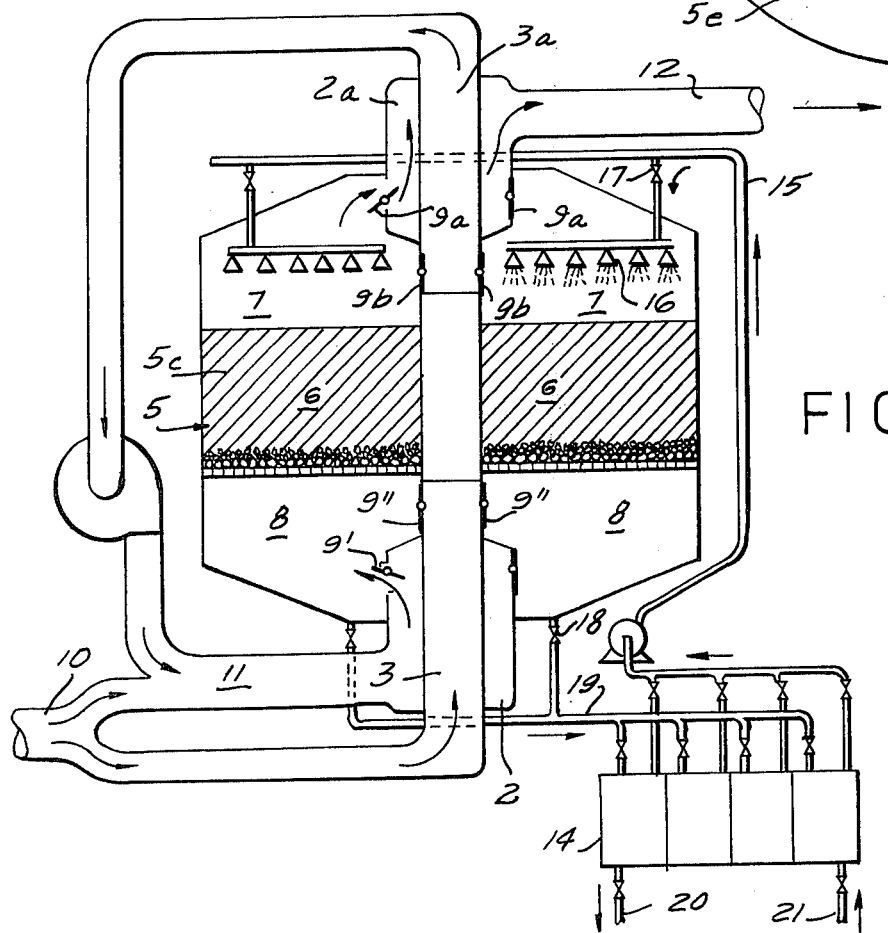
FIG. 3 is an elevation of the apparatus of FIG. 1 in somewhat greater detail illustrating the water washing of compartment 5f, during the phase of the cycle represented by FIG. 2.

Referring now again to the drawings, and more particularly to FIG. 3, illustrating the apparatus during the phase of operation represented by FIG. 2, the remaining compartment 5f, is isolated by its associated valves 9', 9", 9a, and 9b being closed and the water in tank 14 flows through pipe 15 to the valve 17 associated with compartment 5f which valve 17 is open, and the water is sprayed on the carbon layer in this isolated compartment 5f via spray nozzles 16. The sprayed water then flows back to the tank 14 through valve 18 and line 19. Sulphuric acid is extracted as a by-product and is sent to the sulphuric acid reclaimer through pipe 20, and the water in turn is supplied through pipe 21. The valves 17 associated with each compartment other than the then isolated compartment, are closed. The washing equipment is not illustrated in FIG. 1 for clarity, but as readily understood, each compartment includes the spray nozzles 16 and associated valve 17 for washing the carbon layer 6 in each compartment in sequence at the appropriate period in the cycle as will hereinafter be explained.

The apparatus is cyclically operated so that each compartment receives gas from the inlet passage 2 for a predetermined time. Such gas from the inlet passage 2 comprises a mixture of part of the incoming combustion exhaust gas to be treated (i.e. from the main duct 10)

with the remainder being such gas which has previously been passed through compartments then serving for the drying process, i.e. in the portion of the cycle described above, compartments 5a and 5b. During such drying process, part of the sulphur oxide contained in the gas is removed, and the gas is cooled so that the mixed gas flowing in passage 2 has a reduced concentration of sulphur oxides and a reduced temperature in comparison with that flowing in the main duct 10. Such gas passing through the compartments then serving as the adsorption process (i.e., in the portion of the cycle described above, compartments 5c, 5d and 5e), is subject to a dry adsorption process wherein substantially all of the remaining sulphur oxides are removed before the gas is discharged to the atmosphere through exit duct 12.

The valves 9', 9", 9a and 9b associated with each compartment are operated such that each compartment performs the adsorption process for a predetermined time and the valves are then switched so that each compartment is washed for a predetermined time, after which the valves are again switched so that each compartment is used in the drying operation.

In the illustrated embodiment, after a predetermined time, the appropriate valves 9', 9", 9a and 9b of the compartments are switched such that: the previously washed and isolated compartment 5f is now used as a drying compartment; previous drying compartment 5b is now used as an adsorbing compartment (compartment 5a again being used for drying without any change in the valve setting for this compartment); and previous adsorbing compartment 5e is now isolated and is washed with water by opening the associated valves 17 (compartments 5c and 5d again being used for adsorbing, no change in the valves 9', 9", 9a and 9b being required for these compartments 5c and 5d).

Again after the predetermined time, the appropriate valves 9', 9", 9a and 9b of the compartments are switched now such that: the previously washed and isolated compartment 5e is now used as a drying compartment; previous drying compartment 5a is now used as an adsorbing compartment (compartment 5f again being used for drying); and previous adsorbing compartment 5d is now isolated and is washed with water (compartments 5b and 5c again being used for adsorbing).

Again after the predetermined time, the appropriate valves 9', 9", 9a and 9b of the compartments are switched now such that: the previously washed and isolated compartment 5d now used as drying compartment; previous drying compartment 5f is now used as an adsorbing compartment (compartment 5e again being used for drying); and previous adsorbing compartment 5c is now isolated and is washed with water (compartments 5a and 5b again being used for adsorbing).

Again after the predetermined time, the appropriate valves 9', 9", 9a and 9b of the compartments are switched now such that: the previously washed and isolated compartment 5c now used as drying compartment; previous drying compartment 5e is now used as an adsorbing compartment (compartment 5d again being used for drying); and previous adsorbing compartment 5b is now isolated and is washed with water (compartments 5f and 5a again being used for adsorbing).

Again after the predetermined time, the appropriate valves 9', 9", 9a and 9b of the compartments are switched now such that: the previously washed and isolated compartment 5b now used as drying compartment; previous drying compartment 5d is now used as an adsorbing compartment (compartment 5c again being used for drying); and previous adsorbing compartment 5a is now isolated and is washed with water (compartments 5e and 5f again being used for adsorbing).

After the next predetermined time interval, the valves 9', 9", 9a and 9b are switched such that the compartments function as first described and as labeled in FIG. 2, and the cycle repeats.

In this manner the activated charcoal layers 6 of each compartment are successively regenerated without stopping the process of removing the sulphur oxides from the combustion exhaust gases.

The incoming exhaust combustion gases are divided into streams in conduits 11 and 3. The hot gases in conduit 3 dry the previously washed activated carbon layer (since as described above, after a compartment is water washed it is then used to receive the gases from conduit 3 for the drying step) and the mix with the stream in conduit 11. The drying stream from conduit 3 after the drying is somewhat cooler than the exhaust combustion gases in conduit 10 and has reduced sulphur oxides (removed to a substantial degree in the drying step). Such effects on the treated stream in conduit 3 upon mixing in conduit 11 with the incoming exhaust combustion gases provides a combustion exhaust gas which is at preferable conditions for dry adsorbing in carbon layers 5c, 5d and 5e. Such adsorbing produces a mist-free stream of minimum sulphur oxide for dispersion into the atmosphere via exit 12 after passing through layers 5c, 5d and 5e. The remaining activated carbon 5f is washed with water to remove adsorbed sulphur oxides for regeneration. The activated carbons used in the drying, adsorbing and water washing steps are cyclicly treated with the above-mentioned steps at predetermined time intervals to regenerate all activated carbon sections. The flow control valves 9', 9", 9a and 9b are adapted for this cyclic changing of the flow to the selected activated carbon sections. The water system for washing the sections sequentially also includes its own valve system, valves 17, 18, etc., schematically indicated in FIG. 3 of the drawing.

In the present invention, the sulphur oxides in the gases are adsorbed and oxidized to give sulphuric acid, so the combustion exhaust gases should include at least a chemically equivalent volume of oxygen for the oxidation. Furthermore, the concentration of $SO_2$ in the exhaust gas depends upon the sulphur content of the fuel, but is usually less than 0.2 vol. %. However, the present invention may be applied at even higher concentrations than 0.2%. According to the present invention, it is possible to simply and economically eliminate the sulphur oxides contained in the combustion exhaust gases.

The present invention is further illustrated by the following examples, using the exhaust gas from a combustion of heavy oil, having the following analysis: $H_2O$ 11.3%, $O_2$ 3.5%, $SO_2$ 1450 ppm (based on dry gas), $N_2$ 73.6%, $CO_2$ 11.5%, 523 m³/hr, 130°–145° C. Throughout this specification percentages are expressed as volume percentages and absolute volumes have been corrected to Standard Temperature and Pressure conditions.

The above mentioned gas, after passing through a coke layer to remove soot and ash, was transferred to the drying operation at a flow rate of 210 m³/hr. The outlet gas from the drying operation was at 56° C, and 222 m³/hr. The SO₂ concentration had decreased to 360 ppm. The remaining gas at 130°–145° C and 313 m³/hr, was mixed with this outlet gas to produce a gas at 94°–104° C and 535 m³/hr. with a concentration of SO₂ of 1000 ppm. such temperature being suitable for the absorption operation. This gas was blown into the adsorption operation for 4 seconds of contact time (activated carbon from anthracite was used as the adsorbent), and the outlet gas from the adsorption operation was released to the atmosphere at 104°–114° C, the SO₂ concentration being 50–150 ppm. This gas contained no mist, presenting no public nuisance.

The desulphurization ratio was 90–97% based on a continuous operation on the fixed bed apparatus having six compartments containing activated carbon as described above, three being used for adsorption, two for drying, and one for washing at any given time, using a cycle of 5 hours washing, 10 hours drying, 15 hours adsorption. In addition, the sulphuric acid by-product was of such a grade as to be fully available for the production of gypsum and ammonium sulphate.

Next, the test was carried out with half the previous volume of gas to be treated using the equipment of the same size. In this case, the cycle was maintained, changing the washing time to 10 hours, drying to 20 hours and adsorption to 30 hours, and a similar result was obtained. In addition, the desulphurization ratio increased to 95–99%. The tests show the great adaptability of the process with respect to changes of temperature and flow rate.

We claim:

1. A process for eliminating sulphur oxide from combustion exhaust gases, comprising the steps of
   first, dividing said combustion exhaust gases into a first stream and a second stream,
   second, passing said first stream through a first activated carbon which has been previously washed with water, thereby drying said activated carbon, cooling said first stream, and removing a substantial portion of said sulphur oxides from said first stream by adsorption in said activated carbon,
   third, mixing the treated first stream with said second stream,
   fourth, passing said mixed streams through a second activated carbon which was previously dried by said second step, thereby removing sulphur oxides from said mixture by a dry adsorption and producing a mist free low sulphur oxide concentration gas,
   fifth, passing said mist free, low sulphur oxide concentration gas to the atmosphere,
   sixth, washing a third activated carbon which was previously used in said fourth step with water, and removing the previously adsorbed sulphur oxides therefrom, and
   seventh, cyclically treating each of said first, second and third activated carbons by said second, fourth and sixth steps.

2. The process, as set forth in claim 1, wherein said first, second, third, fourth, fifth and sixth steps are continuously and simultaneously performed, and
   each of said activated carbons are simultaneously treated selectively and sequentially to a different of each one of said second, fourth and sixth steps.

3. The process, as set forth in claim 1, further comprising the step of
   filtering said combustion exhaust gases removing solid matter before passing through said activated carbons.

4. A method of desulfurizing waste gases by passing said waste gases through a system comprising a sulfur oxide adsorption region, a water-washing and desorption region and an adsorbent drying region, said region being changed-over from one after another at a predetermined time interval so that adsorption and desorption of the sulfuric oxide and drying of the adsorbent are effected simultaneously in a different region of the system as a whole, said method comprises the step of intermittently pouring water into the water-washing and desorption region.

5. A process for the desulfurization of industrial waste gases and recovering sulfuric acid as a byproduct therefrom by concurrently utilizing an adsoprtion stage, a drying stage, a rinse desorption stage and a concentration stage, the adsorption-drying-rinse-desorption stages being periodically and alternately shifted in a time sequence which comprises introducing a portion of the industrial waste gases into the desorption stage to remove sulfuric oxide gases therefrom, and introducing the remaining porton into the drying stage for drying the active carbon contained therein which has been wet in the preceding rinse desorption stage, directing the waste gases leaving the drying stage into the adsorption stage, removing the waste gases free of sulfuric oxide from the adsorption stage and releasing said gases to the atmosphere, introducing rinsing water into the rinse desorption stage to desorb the sulfuric oxide therein, removing the washings from the rinse desorption stage and introducing the washings into the concentration stage, heating the washing in said concentration stage and recovering the sulfuric acid produced.

6. The process of claim 5 wherein the waste gases leaving the drying stage have a decreased sulfurous anhydride concentration and an increased water content.

7. The process of claim 5, whrein washings removed from the rinse desorption stage can optionally be introduced into a neutralizing stage when the concentration stage becomes inoperative or unable to possess excessive amounts of said washings.

8. The process for the desulfurization of industrial waste gases according to claim 5, in which said process further comprises the step of neutralizing the washings from the rinsing step with an alkaline compound preparatory to the abandonment of the same.

9. A method of desulfurizing waste gas according to claim 4, in which waste gases are introduced into the adsorbent drying region for drying the wet adsorbent, the waste gases leaving said drying region are introduced into the adsorption region for the adsorption of the sulfur oxides contained therein and the waste gases leaving said adsorption region are discharged into the atmosphere.

10. A process for the desulfurization of industrial waste gases by currently utilizing an adsorption stage, a drying stage, a rinse desorption stage, the adsorption-drying-rinse-desorption stages being periodically and alternately shifted in a time sequence, which comprises introducing a portion of the industrial waste gases into the adsorption stage to remove sulfur oxide gases therefrom, and introducing the remaining portion into the drying stage for drying the active carbon contained therein which has been wet in the preceding rinse-desorption stage, directing the waste gases leaving the drying stage into the adsorption stage, removing the waste gases free of sulfur oxides from the adsorption stage and releasing said gases to the atmosphere, introducing rinsing water into the rinse-desorption stage to desorb the sulfur oxides therein, removing the washings from the rinse-desorption stage, and producing sulfuric acid.

* * * * *